(12) United States Patent
Duzly et al.

(10) Patent No.: US 8,966,176 B2
(45) Date of Patent: Feb. 24, 2015

(54) MEMORY MANAGEMENT STORAGE TO A HOST DEVICE

(75) Inventors: Yacov Duzly, Ra'anana (IL); Guy Freikorn, Qiryat Ono (IL); Nir Perry, Holon (IL); Alon Marcu, Tel-Mond (IL)

(73) Assignee: SanDisk IL Ltd., Kfar Saba (IL)

( * ) Notice: Subject to any disclaimer, the term of this patent is extended or adjusted under 35 U.S.C. 154(b) by 373 days.

(21) Appl. No.: 13/125,007

(22) PCT Filed: Aug. 31, 2010

(86) PCT No.: PCT/IB2010/002153
§ 371 (c)(1),
(2), (4) Date: Apr. 19, 2011

(87) PCT Pub. No.: WO2011/148223
PCT Pub. Date: Dec. 1, 2011

(65) Prior Publication Data
US 2011/0296088 A1     Dec. 1, 2011

Related U.S. Application Data

(60) Provisional application No. 61/348,838, filed on May 27, 2010.

(51) Int. Cl.
*G06F 12/00* (2006.01)
*G06F 12/02* (2006.01)
*G06F 12/08* (2006.01)

(52) U.S. Cl.
CPC .......... *G06F 12/0246* (2013.01); *G06F 12/08* (2013.01); *G06F 2212/1041* (2013.01); *G06F 2212/7201* (2013.01); *G06F 2212/7207* (2013.01)

USPC .............. 711/115; 711/154; 711/162; 710/22

(58) Field of Classification Search
None
See application file for complete search history.

(56) References Cited

U.S. PATENT DOCUMENTS

| | | | |
|---|---|---|---|
| 5,630,093 A | 5/1997 | Holzhammer et al. | |
| 5,802,069 A * | 9/1998 | Coulson | 714/718 |
| 6,286,057 B1 * | 9/2001 | Cornaby et al. | 710/5 |
| 7,080,232 B2 | 7/2006 | Aasheim et al. | |
| 7,089,424 B1 * | 8/2006 | Subbiah | 713/189 |
| 2006/0095615 A1 * | 5/2006 | Kim et al. | 710/62 |
| 2006/0112252 A1 * | 5/2006 | Dixon | 711/170 |
| 2006/0259718 A1 | 11/2006 | Paley | |
| 2006/0282644 A1 | 12/2006 | Wong | |
| 2008/0082736 A1 | 4/2008 | Chow et al. | |

(Continued)

OTHER PUBLICATIONS

International Search Report and Written Opinion for International Application No. PCT/IB2010/002153 dated Mar. 7, 2011, 9 pages.

(Continued)

*Primary Examiner* — Christian P Chace
*Assistant Examiner* — Brendan Lillis
(74) *Attorney, Agent, or Firm* — Toler Law Group, PC

(57) ABSTRACT

Systems and methods of memory management storage to a host device are disclosed. A method is performed in a data storage device with a non-volatile memory and a controller operative to manage the non-volatile memory and to generate management data for managing the non-volatile memory. The method includes performing, at a given time, originating at the controller data management transfer to a host device or originating at the controller data management retrieval from the host device.

20 Claims, 4 Drawing Sheets

(56) References Cited

U.S. PATENT DOCUMENTS

| | | |
|---|---|---|
| 2008/0177937 A1 | 7/2008 | Nishihara et al. |
| 2008/0189485 A1* | 8/2008 | Jung et al. .................... 711/115 |
| 2009/0113121 A1* | 4/2009 | Lee et al. ...................... 711/103 |
| 2009/0182962 A1* | 7/2009 | Khmelnitsky et al. ........ 711/162 |
| 2009/0313417 A1 | 12/2009 | Wan |
| 2009/0327589 A1 | 12/2009 | Moshayedi |
| 2010/0312947 A1* | 12/2010 | Luukkainen et al. ......... 711/103 |

OTHER PUBLICATIONS

International Preliminary Report on Patentability for International Application No. PCT/IB2010/002153, issued Nov. 27, 2012, 6 pages.

* cited by examiner

MEMORY MANAGEMENT STORAGE TO A HOST DEVICE

FIELD OF THE DISCLOSURE

The present disclosure generally relates to storing and retrieving memory management data of a non-volatile memory device.

BACKGROUND

Managed flash storage devices, such as embedded or removable cards, often include flash memories and a controller. The controller may include a microprocessor that executes flash management software. The flash management software may maintain a database of several tables, such as a logical to physical address translation table.

Such tables may be kept in a volatile memory of the storage device. Although larger management tables may enable increased performance, the management tables may be limited in size by the volatile memory of the controller. For example, a capacity of a random access memory (RAM) embedded in the controller may be limited by manufacturing costs. In addition, volatile memory does not retain information upon power down. As a result, after power down, the tables may be rebuilt using a process that takes time and resources when the storage device is powered up.

SUMMARY

A data storage device is disclosed that includes a controller and a non-volatile memory. The data storage device stores data, such as for a user, an operating system (OS) of a host device, or applications. Memory management data, such as management tables, may be stored or generated on the fly by the controller for management of the non-volatile memory. For example, the data storage device may be a flash memory card with a controller that generates management data to manage a flash memory array.

The data storage device may initiate a data transfer operation to store or retrieve management data to/from the host device memory in order to virtually increase the controller's internal storage space and enhance the device's performance. The data storage device may also use the host memory for storage so that the data can be retrieved after power up where data stored in the internal controller RAM is lost. Using the host memory as storage for management data that is retrieved after power up may enhance the power-up start up time for the device.

DETAILED DESCRIPTION

Figure 1:
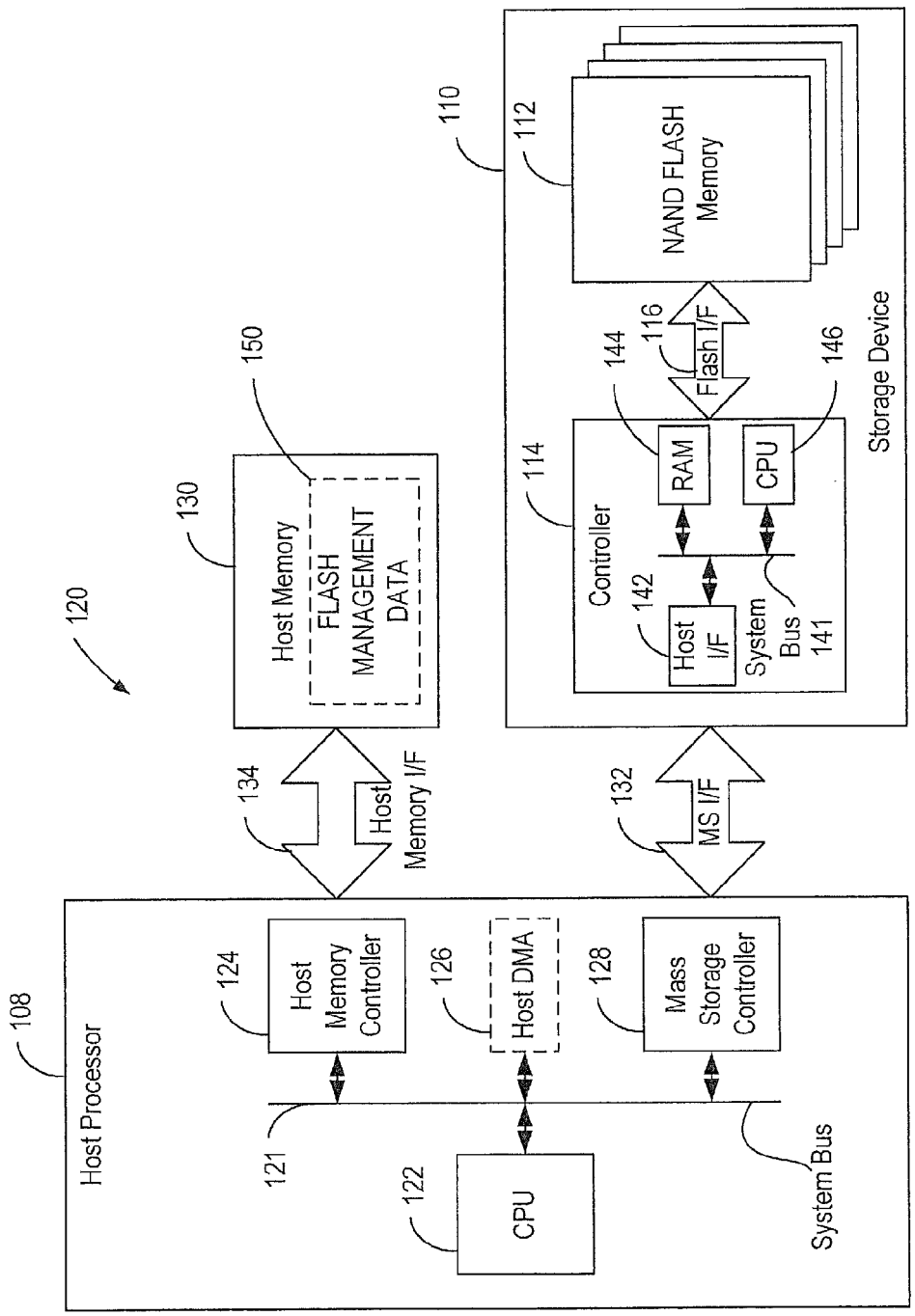
FIG. 1 is a block diagram of an illustrative embodiment of a system including a data storage device configured to transfer management data for a non-volatile memory to a host device.

A storage device is disclosed that is capable of using a memory of a host device to virtually extend an internal controller RAM. The storage device is capable of writing data into a host RAM. The storage device is also capable of reading this data later in time from the host RAM. The data read/written to the host memory is used during controller operation, virtually increasing the controller RAM capacity. The writing and reading to host RAM may be initiated by the storage device sending dedicated commands that instruct the host to store and retrieve data. The writing and reading to host RAM may be performed at the device driver level transparently to the host operating system or applications.

The storage device may maintain a policy of backing up data residing in its internal RAM to the host. The host may turn off power of the storage device to save energy. In most scenarios where the storage device power is turned on and off, the host maintains power for the host RAM because the host RAM is used for code execution. After turning on the power of the storage device, the storage device rebuilds its tables by using the information stored in host RAM much faster then it would take rebuilding the tables without using the stored information.

Read and write latencies of a NAND flash may be on the order of tens of microseconds, and although read and write latencies of the host RAM may be on the order of tens of nanoseconds, a speed of data transfer from the host RAM may be limited by the time it takes to transfer the data to the controller. Improvements in high-speed interface technologies enable increasingly faster data transfer and bandwidth, and in some cases storage of the tables to the host RAM and retrieval from the host RAM may be performed faster than if the tables were stored and retrieved from the NAND flash within the storage device.

In addition, NAND flash may have a limited endurance arising from accumulated wear effects that may result from write and erase operations to the NAND flash. In some implementations, management data transferred to the host RAM may also be stored to the non-volatile memory so that the management data is recoverable in case the host RAM powers down. In other implementations, however, the tables may be stored to the host RAM without also being stored to the NAND flash. As a result, the NAND flash will have a reduced number of write and erase cycles as compared to implementations where the tables are stored to the NAND flash. Because the size of the management data may be small compared to the overall size of the NAND flash, the resulting improvement to the flash endurance, while beneficial, may be relatively small.

According to a particular embodiment, reading data from and writing data to the host RAM may implement a technique called bus mastering or "first-party direct memory access" (FPDMA). "First-party DMA" is different from "third-party DMA" where a system DMA controller (the third party) is actually doing a data transfer (the first two parties are, for example, the host processor and a peripheral). In contrast, "first-party DMA" refers to a system where the peripheral actually takes control of the system bus to perform the transfer by initiating the transactions. FPDMA is implemented by hardware, making it fast and efficient.

The host processor may be coupled to a mass storage device via a mass storage (MS) interface. Examples of mass storage interfaces are secure digital (SD) interfaces, such as SD3.0, ultra high speed (UHS) interfaces, such as UHS-II, multimedia card (MMC) interfaces, serial advanced technology attachment (SATA) interfaces and others. Use of high speed interfaces (e.g. UHS-II) may enable management data transfer rates between the host and the controller that approach or exceed read/write speeds to the NAND flash.

The host processor may include (but is not limited to) a central processing unit (CPU), a host memory controller, a mass storage controller, and a DMA controller, all coupled via a system bus (or equivalent). A host DMA controller may be used for moving data between the MS interface and the host memory, freeing the CPU to perform other tasks.

The storage device may include a controller and NAND flash memories. The controller can include a processor that runs flash management firmware, a RAM, and optionally a DMA controller. The DMA controller may capable of moving data between the internal RAM of the controller and the host interface. The DMA controller may also be capable of moving data between the flash memory and the controller RAM or the host interface.

Referring to FIG. 1, a representative system includes a storage device 110 coupled to a host device 120 via a device interface 132, such as a mass storage interface (MS I/F). The host device 120 includes a host processor 108 that is coupled to a host memory 130, such as a DRAM, via a host memory interface 134. The host memory 130 may be within the host device 120 and is coupled to the host processor 108 via the host memory interface 134 to transmit data to and to receive data from the host processor 108.

The storage device 110 includes a controller 114 and a non-volatile memory 112, such as a NAND flash array. The controller 114 is coupled to the non-volatile memory 112 via a non-volatile memory interface 116, such as a flash interface. The storage device 110 may be a removable flash storage device, such as a universal serial bus (USB) flash drive (UFD) or a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). Alternatively, the storage device 110 may be embedded memory in the host device 120, such as eMMC® (trademark of JEDEC Solid State Technology Association, Arlington, Va.) and eSD, as illustrative examples.

The controller 114 includes a system bus 141, a volatile memory 144 (e.g. RAM), and a central processing unit (CPU) 146. The controller 114 includes logic 142, such as the illustrated host interface. The host interface optionally includes a direct memory access (DMA) controller (not shown) that may be configured to perform first-party DMA (FPDMA) operations. The CPU 146 is coupled to the logic 142 and to the volatile memory 144 via the system bus 141.

The host processor 108 includes a host memory controller 124 and a host processing unit 122 (e.g. a CPU). The host processing unit 122 is coupled to the host memory 130 via the host memory controller 124 to enable the host processing unit 122 to access the host memory 130 via the system bus 121, the host memory controller 124, and the host memory interface 134.

The host processor 108 may optionally include a host direct memory access (DMA) controller 126, which is coupled to the system bus 121. The host processor 108 further includes a device interface controller 128, such as a mass storage controller, coupled to the system bus 121. The device interface controller 128 is coupled to the storage device 110 via the device interface 132.

The controller 114 is configured to manage the non-volatile memory 112 and to generate management data 150 for managing the non-volatile memory 112, such as flash management data, that is accessible at the controller memory 144 during management of the non-volatile memory 112. For example, the management data 150 may include a logical address to physical address mapping table that is generated and updated by the controller 114 to manage the non-volatile memory 112. When the data storage device 110 is operatively coupled to the host device 120, the controller 114 may be operative to determine a need to transfer the management data 150 generated by the controller 114 or a need to retrieve the management data 150 from the host device 120. Based on the determined need, the controller 114 may be operative to initiate transfer of the management data 150 from the data storage device 110 to the host device 120 or to initiate retrieval from the host device 120 of the management data 150.

For example, the controller 114 may be configured to originate a data management transfer to transfer the management data 150 to the host device 120 on determining the need to use a host device memory (e.g. the host memory 130) as a virtual extension of the volatile memory 144. To illustrate, the management data 150 for the non-volatile memory 112 may be transferred from the controller memory 144 to the host device 120 in response to the management data 150 requiring more memory space than is available at the controller memory 144. The management data 150 may alternatively, or in addition, be transferred to the host device 120 in response to the controller 114 detecting an event while the controller 114 is operatively coupled to the host device 120. Thus, the management data 150 may be transferred by the storage device 110 to the host device 120 and stored within the host memory 130.

The data management transfer to the host device 120 is originated at the controller 114 to store the management data 150 at the host memory 130. The host device 120 does not request the management data 150 and may be unable to use the management data 150. For example, the controller 114 may be configured to encrypt the management data 150 and to transfer the encrypted management data to the host device 120 without providing a key to the host device 120 for decrypting the encrypted management data. Instead, the key that enables decryption of the encrypted management data may be stored at the data storage device 110 and used by the controller 114 to recover the management data 150 after the encrypted management data has been retrieved from the host device 120. The storage device 110 initiates transfer of the management data 150 without receiving a request for the management data from the host device 120.

In addition to using the host memory 130 as a virtual extension of the volatile memory 144, the controller 114 may be configured to originate a data management transfer to transfer the management data 150 to the host device 120 on determining the need to use a host device memory (e.g. the host memory 130) to hold the management data 150 when the data storage device 110 is to be powered down. For example, the controller 114 may initiate transfer of the management data 150 to the host device 120 in response to detecting an event that may include receiving an indication that the storage device 110 is to be powered down.

Alternatively, the management data 150 may be retrieved from the host device 120 by the controller 114. In this case, a data retrieval operation may be initiated by the storage device 110 in response to the controller 114 determining a need to retrieve the management data 150 from the host device 120. The controller 114 may be configured to originate data management retrieval from the host device 120 on determining the need to access the management data 150 when the data storage device 110 receives power (after transferring the management data 150 to the host device 120 and being powered down). To illustrate, the controller 114 may initiate retrieval of the management data 150 in response to detecting an event that includes the data storage device 110 receiving power after the data storage device 110 has transferred the management data 150 to the host device 120 and entered a power-down state.

Figure 2:
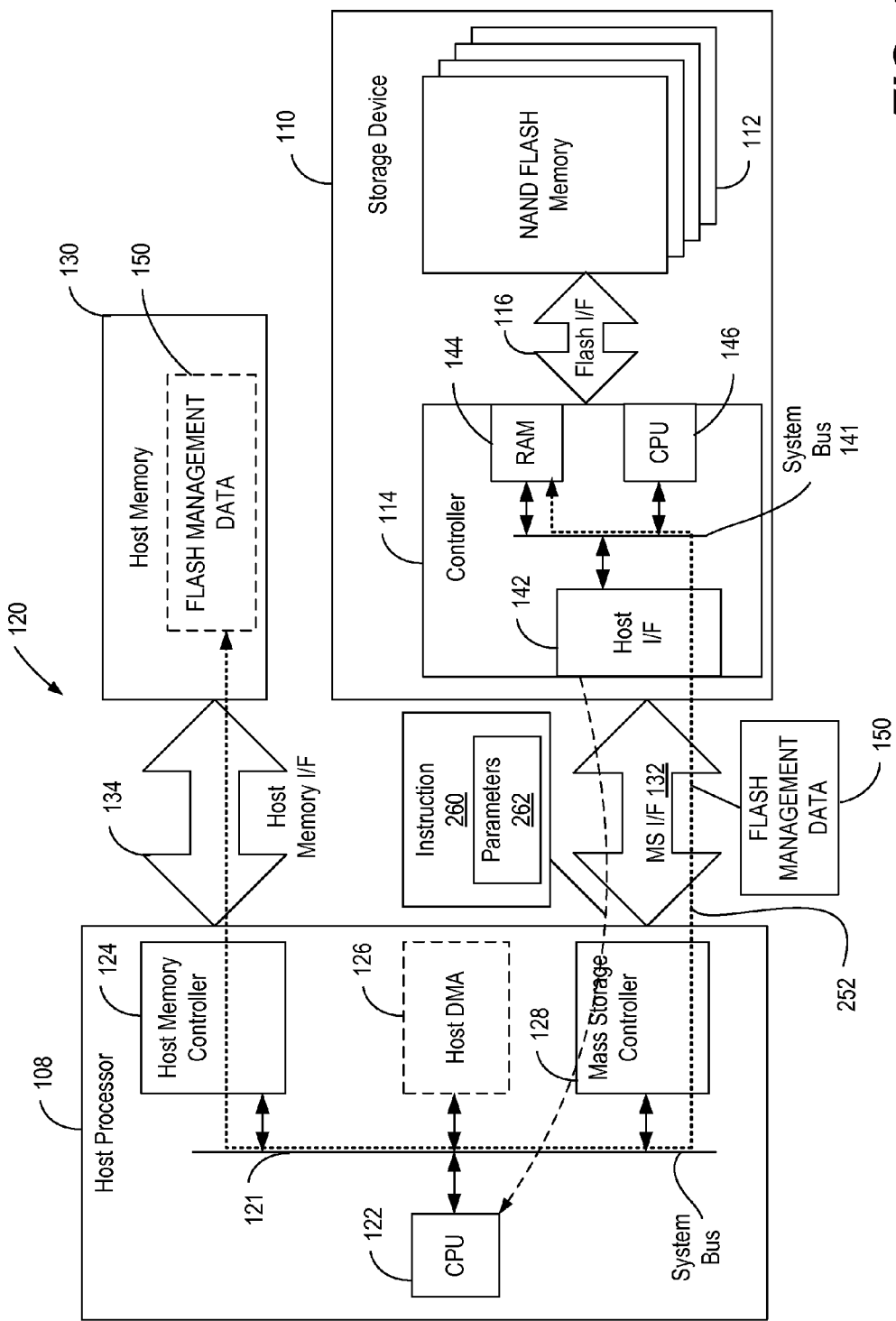
FIG. 2 is a block diagram of the system of FIG. 1 depicting an illustrative embodiment of a transfer path of management data between the data storage device and the host device.

The storage device 110 may initiate an instruction for the host device 120 to transfer the management data 150 to the host memory 130 or may initiate an instruction for the host device 120 to send the management data 150 back from the host device 120 to the data storage device 110, as described in FIG. 2. The host processor 108 may facilitate the data transfer or retrieval via signaling on the system bus 121. In an optional implementation where the host device 120 includes the host DMA controller 126, the processing unit 122 may respond to the instruction by instructing the host DMA controller 126 to facilitate the data transfer or retrieval. In an implementation where the logic 142 includes a DMA controller, the DMA controller may be configured to enable the controller 114 to selectively initiate the data transfer or the data retrieval. For example, the DMA controller may be configured to instruct the host DMA controller 126 to transfer the management data 150 from the controller memory 144 to the host memory 130 or to retrieve the management data 150 from the host memory 130 to the controller 114.

In an implementation where the data storage device 110 is a removable memory card, the memory card may be selectively inserted into a socket of the host device 120 to be removably connected to the host device 120. When the data storage device 110 is embedded memory in the host device 120, the data storage device 110 may be permanently affixed within or connected to the host device 120. For example, the host device 120 may comprise a personal computer, a portable computer, or a mobile communication device (e.g. cellular phone, smart phone) that incorporates an embedded memory that includes the data storage device 110.

By initiating transfers of the management data 150 to the host memory 130 and retrievals of the management data 150 from the host memory 130, the storage device 110 makes use of available resources in a way that may benefit both the storage device 110 and the overall system. The storage device 110 is able to have a small form factor (e.g. a microSD form factor). Maintaining the management data 150, such as flash management tables, on host RAM may boost performance.

Referring to FIG. 2, a particular embodiment that illustrates further details of operation of a system including the host device 120 and the storage device 110 is illustrated. The management data 150 may be transferred and retrieved between the storage device 110 and the host device 120 via a data transfer and retrieval path 252. For example, during a transfer of the management data 150 from the controller memory 144 to the host memory 130, the illustrated data transfer path 252 includes the controller system bus 141, the logic 142, the device interface 132, the device interface controller 128, the host system bus 121, the host memory controller 124, and the host memory interface 134. During a retrieval of the management data 150 from the host memory 130 to the controller memory 144, the data retrieval path 252 may include the host memory interface 134, the host memory controller 124, the host system bus 121, the device interface controller 128, the device interface 132, the logic 142, and the controller system bus 141.

In the illustrated embodiment where the logic 142 includes the DMA controller, the management data 150 may be sent or received by the DMA hardware configured by the controller 114. For example, the controller 114 may initiate an instruction 260 and in some instances may provide one or more transfer or retrieval parameters 262, while in other instances the controller 114 may send the instruction 260 without providing any transfer or retrieval parameters.

Data management transfer originated at the controller 114 may include sending to the host device 120 a transfer instruction, and data management retrieval originated at the controller 114 may include sending to the host device 120 a retrieval instruction. The transfer instruction may include one or more transfer parameters. For example, the transfer parameters may include one or more of: a start address; a data transfer size; a maximal controller buffer size; a DMA transfer priority; a unique identifier (ID); a time stamp; and a signature. Although in some instances the transfer instruction may include one or more transfer parameters, in other instances the transfer instruction may include none.

The retrieval instruction may include one or more retrieval parameters, such as one or more of: a start address; a data retrieval size; a maximal controller buffer size; a DMA priority; a unique ID; a time stamp; and a signature. The start address may be a relative address and the maximal controller buffer size may be included so that the host sends one buffer size at a time and does not exceed the designated maximal controller buffer size. The DMA transfer priority may indicate whether to queue the command after a previous command or to execute before one or more other commands. Although in some instances the retrieval instruction may include one or more retrieval parameters, in other instances the retrieval instruction may include none.

In implementations where the parameters 262 are sent to the host device 120, the instruction 260 and the parameters 262 may be communicated from the controller 114 to the host device 120 separately or as a single instruction 260 that includes the parameters 262. For example, the logic 142 may determine a data length of the management data 150 resident in the controller memory 144 and provide such information to the host device 120 via the parameters 262.

To illustrate, the controller 114 may negotiate with the host device 120 about the size of storage space the controller 114 may get. Different hosts may be capable of providing different RAM sizes for the use of the storage device 110. The controller 114 may send data to the host storage specific location relative to the storage space starting address. For example, if the host device 120 reserves on the host memory 130 an area starting at address 123000, this address may be translated to 0 from the point of view of the controller 114.

The controller 114 may implement a paging mechanism that implements virtual memory. For example, the controller 114 may implement a paging mechanism that is similar to a virtual memory mechanism implemented by an operating system where some RAM areas are stored on a hard disk and where a request to access a RAM area that is stored on the hard disk causes the operating system to fetch the appropriate page from the hard disk. As applied to the system of FIG. 2, the controller 114 may implement a paging mechanism where some memory areas are stored to the host memory 130. In response to a request to access one of these memory areas (e.g. from flash management firmware executed by the CPU 146), the controller 114 initiates a data transfer from the host memory 130.

In an embodiment where the host device 120 does not include the host DMA controller 126, the host processing unit 122 may facilitate the data transfer between the storage device interface and the host memory 130 by reading the data from the interface and writing it back to the memory 130 (or vice versa). In another embodiment where the host device 120 includes the host DMA controller 126, the host processing unit 122 receives the instruction 260 and the parameters 262 and may facilitate the data transfer or retrieval itself or may instruct the host DMA controller 126 to facilitate the data transfer or retrieval. In each of these embodiments, the specific mechanism by which data is transferred or retrieved within the host device 120 may be transparent to the data storage device 110. In either case, the data storage device 110 initiates the data transfer or retrieval operation by sending the instruction 260 to the host device 120 and receives or sends the requested management data 150 via the device interface 132. The transfer of the management data 150 from the controller 114 to the host device 120 may be initiated based on determining a need to transfer the management data 150 to use a host device memory as a virtual extension of the volatile memory 144 when a size of the management data 150 exceeds an available capacity of the volatile memory 144. Alternatively, the transfer of the management data 150 may be initiated based on determining a need to transfer the management data 150 in response to one or more other events. For example, transfer of the management data 150 may be initiated at the data storage device 110 in response to receipt of an indication that the data storage device 110 is to be powered down. To illustrate, the host device 120 may send a command or a signal to the data storage device 110 indicating that the host device 120 is going to power down the data storage device 110 and there are no data transfer operations expected before the power down. In the event that the data storage device 110 is to be powered down, in order to save the management data 150 prior to the powered down condition, the logic 142 may initiate the data transfer operation so that the management data 150 is stored at the host memory 130 prior to the storage device 110 signaling to the host device 120 that the storage device 110 is ready to be powered down.

Thus, operation of the data storage device 110 may include the controller 114 performing, at a given time, originating at the controller 114 data management transfer to the host device 120 or originating at the controller 114 data management retrieval from the host device 120. The data management transfer to the host device 120 may be originated by determining a need to transfer the management data 150 generated by the controller, and, based on the determined need, initiating transfer of the management data 150 from the data storage device 110 to the host device 120. As one example, the controller 114 may originate the data management transfer to the host device 120 on determining the need to use a host device memory as a virtual extension of the volatile memory 144. As another example, the controller may originate the data management transfer to the host device 120 on determining the need to use a host device memory to hold the management data 150 when the data storage device 110 is to be powered down.

The transfer of the management data 150 from the data storage device 110 to the host device 120 may be initiated by sending a transfer instruction to the host device 120. In some instances, the transfer instruction may include one or more transfer parameters (e.g. the instruction 260 and the parameters 262). The transfer instruction may instruct the host device 120 to facilitate transferring the management data 150 and the transfer parameters (if provided) may indicate the management data 150 to be transferred.

In an example implementation where the data storage device 110 has initiated the data transfer operation by sending the instruction 260 to the host device 120, the host DMA controller 126 may facilitate the data transfer operation by generating signals including one or more requests for read access to the management data 150 and one or more requests for write access to a destination of the management data 150. The management data 150 may be transferred from the data storage device 110 to the host device 120 by indicating to the host device 120 that the controller 114 requests an action of the host device 120 (e.g. by raising a flag in a status register) In response to the request from the storage device 110, the storage device 110 may receive a query from the host device 120 and in reply the storage device 110 may request the host device 120 to store a specified amount of the management data 150 to the host memory 130 at a specified relative address. The host device 120 may then receive the data from the storage device's interface and store the data to the appropriate location in the host memory 130.

The data management retrieval from the host device 120 may be originated by the controller 114 by determining a need to retrieve the management data 150 from the host device 120. Based on the determined need, the controller 114 may initiate retrieval from the host device 120 of the management data 150, and the management data 150 may be received from the host device 120. The controller 114 may originate the data management retrieval from the host device 120 on determining the need to access the management data 150 when the data storage device 110 receives power. The data management retrieval may be initiated by sending a retrieval instruction to the host device 120. The retrieval instruction may include one or more retrieval parameters (e.g. the instruction 260 and the parameters 262). The retrieval instruction may instruct the host device 120 to perform a data retrieval of the management data 150 from the host memory 130, and the retrieval parameters (if provided) may indicate the management data 150 to be sent back to the data storage device 110.

Figure 3:
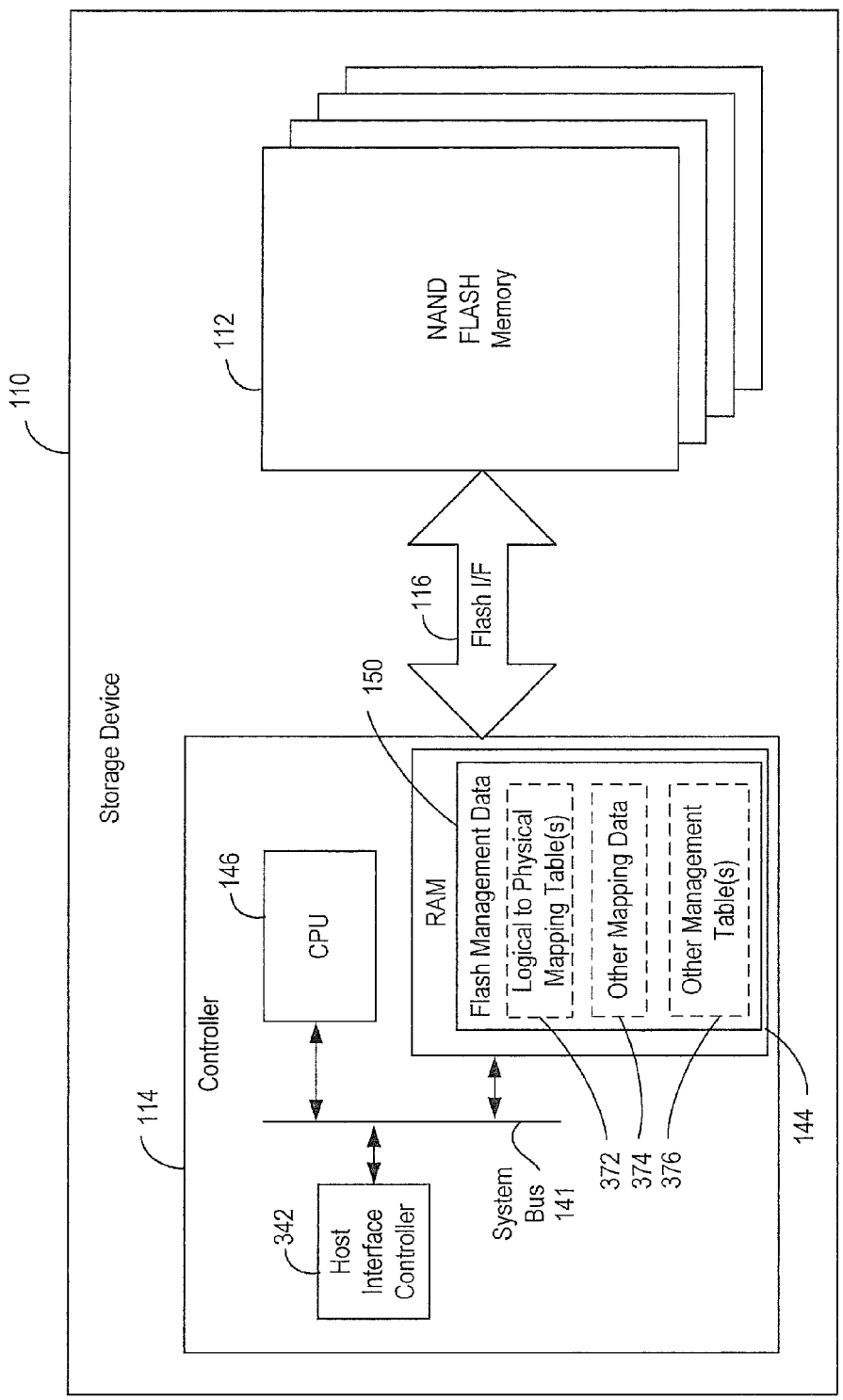
FIG. 3 is a block diagram of the data storage device of FIG. 1 depicting an illustrative embodiment of flash management data resident in a controller memory.

Referring to FIG. 3, further details of the flash management data 150 stored within the volatile memory 144 (e.g. RAM) of the controller 114 within the storage device 110 is illustrated. As illustrated, the management data 150 may include flash management data including one or more logical to physical mapping tables 372, one or more other management tables 376, other mapping data 374, other flash management data, or any combination thereof. The controller 114 is configured to manage the non-volatile memory 112 using the management data 150. For example, the controller 114 can update the logical to physical mapping tables 372 as part of a wear-leveling operation of the non-volatile memory 112. Thus, the storage device 110 illustrated in FIG. 3 maintains the management data 150 within the controller memory 144 (e.g. a volatile memory) for use by the controller 114 to manage and control operation of the non-volatile memory 112.

In the illustrated embodiment of FIG. 3, the controller 114 includes a host interface controller 342 to enable the controller 114 to communicate data to a host device. For example, the host interface controller 342 may control retrieval of the management data 150 from the controller memory 144, such that the retrieved flash management data 150 may be communicated from the storage device 110 to a host device.

Although the management data 150 is depicted in FIG. 3 as being contained within the controller memory 144, all or part of the management data 150 may have a size that exceeds an available capacity of the controller memory 144. For example, the controller 114 may generate flash management data that is too large to be maintained at the controller memory 144 (e.g., a non-used capacity of the controller memory 144 may be smaller than a data size of the management data 150). The controller 114 may initiate a data transfer operation to transfer all or part of the flash management data to the host device 120. The controller 114 may therefore use the host memory 130 as a virtual extension of the controller's RAM.

Figure 4:
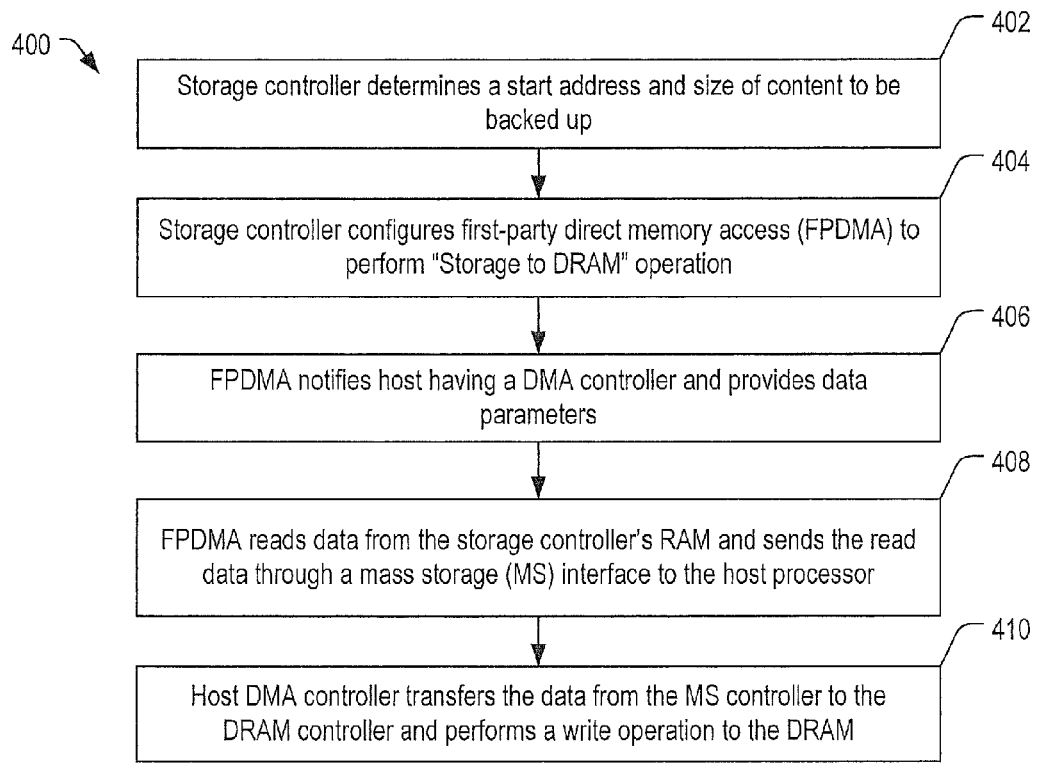
FIG. 4 is a flow diagram of an illustrative embodiment of a method of performing a memory operation to store management data at a host.

Referring to FIG. 4, a particular illustrative embodiment of a method of transferring management data is shown and generally designated 400. As previously described, in some embodiments a flash management data transfer operation is initiated by instructing the host to send or receive the management data, and the specific transfer mechanism used within the host (e.g. CPU or DMA) is transparent to the storage device. The method 400 illustrates an alternative embodiment where the data transfer is facilitated by the host DMA.

A controller at a data storage device determines a start address and size of content to be backed up, at 402. The method further includes the controller configuring a first-party direct memory access to perform a storage to host memory (e.g. DRAM) operation, at 404. For example, the controller may be the controller 114 and the first-party direct memory access may be configured by a DMA controller included in the logic 142 shown in FIGS. 1-2. The first-party DMA notifies a host having a DMA controller of the data transfer operation and provides data parameters, at 406. For example, the logic 142 may include the DMA controller that sends the instruction 260 including or otherwise identifying the parameters 262.

The first-party DMA reads data from the controller RAM and sends the read data through a mass storage interface to the host processor, at 408. For example, the logic 142 may include a DMA controller that reads the management data 150 from the controller memory 144 and sends the management data 150 to the host device 120. The host DMA controller facilitates transfer of the data from the mass storage controller to the host memory controller and performs a write operation to the host memory, at 410. For example, the host DMA controller 126 may facilitate transfer of the management data 150 from the device interface 132 to the host memory controller 124 and performs a write operation using the host memory controller 124 to write the management data 150 to the host memory 130. The data transfer operation may therefore transfer the management data from the data storage device to a host memory, such as for virtual extension of the controller memory or maintaining the management data during a power-down event.

Figure 5:
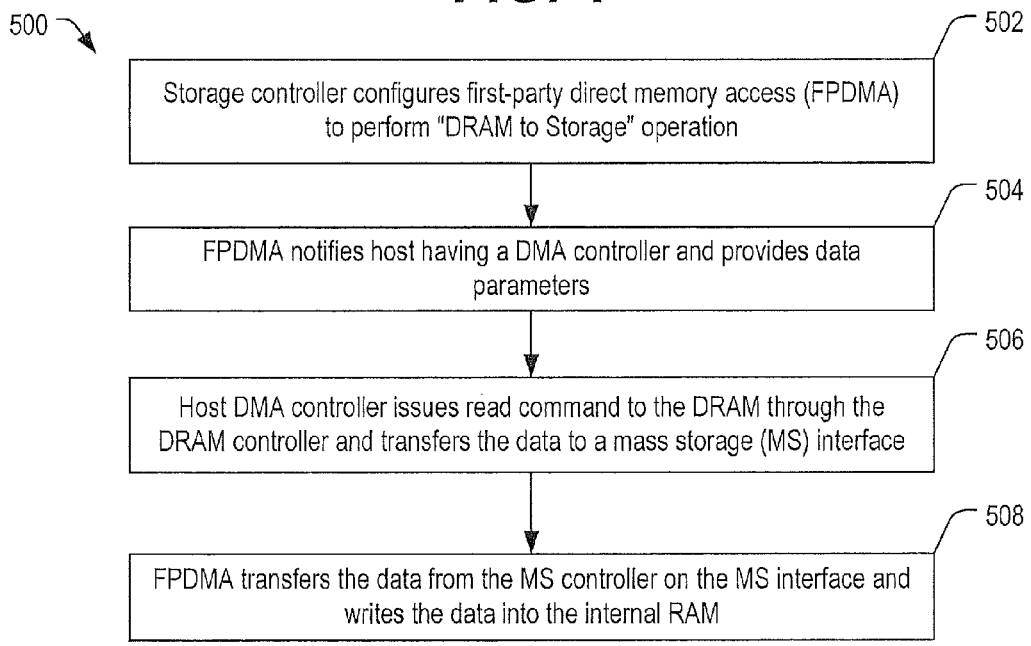
FIG. 5 is a flow diagram of an illustrative embodiment of a method of performing a memory operation to retrieve previously stored management data from a host.

Referring to FIG. 5, an example of a method of transferring flash management data from a host memory to a data storage device is depicted and generally designated 500. As previously described, in some embodiments a flash management data transfer operation is initiated by instructing the host to send or receive the management data, and the specific transfer mechanism used within the host (e.g. CPU or DMA) is transparent to the storage device. The method 500 illustrates an alternative embodiment where the data transfer is facilitated by the host DMA.

The method 500 includes a storage controller configuring a first-party direct memory access controller to perform a host memory (e.g. DRAM) to storage operation, at 502. For example, the controller 114 of the data storage device 110 may instruct the logic 142 to initiate a data transfer operation to transfer the flash management data 150 to the controller 114. The first-party DMA notifies the host and provides data parameters, at 504. For example, the logic 142 may include a DMA controller that sends an instruction, such as the instruction 260, and the parameters 262 to the host device 120. The host DMA controller may be configured to issue a read command to the host memory through the host memory controller and to transfer the data to a mass storage interface, at 506. For example, the host DMA controller 126 may issue the read command to the host memory 130 through the host memory controller 124 and transfer the management data 150 to the device interface 132.

The first-party DMA transfers the data from the mass storage controller to the mass storage interface and writes the data into the internal RAM, at 508. For example, the logic 142 may include a DMA controller that transfers the management data 150 from the device interface 132 and writes the management data 150 into the controller memory 144. The data transfer operation may therefore transfer the management data from a host memory to a data storage device, such as to retrieve the management data after a power-up event.

The controller 114 may be configured to keep information that will enable the data storage device 110 to recover from power down without getting information from the host device 120 (e.g. the host device 120 may be powered down and lose the data stored in the host memory 130). The controller 114 may keep a signature of every block of data the controller 114 sends to be stored at the host memory 130 and may be configured to verify the integrity of that data upon receiving the data from the host device 120 to verify that the data has not be destroyed or manipulated The controller 114 may keep track of its state and mange a state counter in its non-volatile memory 112. The state counter can be attached to any data sent to the host device 120 and may be used for power recovery. At power up, the controller 114 may compare the stored state to the state number of the data received from the host device 120 and to verify that both states match prior to using this data. By comparing the state counter values, the controller 114 may verify that the data stored in the host memory 130 represents the latest device state before power down.

Although various components depicted herein are illustrated as block components and described in general terms, such components may include one or more microprocessors, state machines, or other circuits configured to enable the data storage device 110 of FIGS. 1-3 to perform the particular functions attributed to such components, or any combination thereof. For example, the controller 114 of FIGS. 1-3 may represent physical components, such as hardware controllers, state machines, logic circuits, or other structures to enable the data storage device 110 of FIGS. 1-3 to transfer management data to the host device 120 and retrieve the management data from the host device 120.

For example, the logic 142 (e.g. configured to instruct the host to send or receive flash management data) may be implemented using a microprocessor or microcontroller programmed to determine a starting address and/or a data transfer size of the management data, and to initiate a data transfer operation with the host device 120. Although the logic 142 can include a hardware-implemented DMA controller (i.e. dedicated circuitry), the logic 142 may also or alternatively include executable instructions that are executed by a processor and the instructions are stored at the memory 112. Alternatively, or in addition, executable instructions that are executed by a processor (such as the CPU 146 or a processor that may be included in the logic 142) may be stored at a separate memory location that is not part of the memory 112, such as at the RAM 144 or at a read-only memory (ROM) (not shown).

In a particular embodiment, the data storage device 110 may be a portable device configured to be selectively coupled to one or more external devices. However, in other embodiments, the data storage device 110 may be attached or embedded within one or more host devices, such as within a housing of a portable communication device. For example, the data storage device 110 may be within a packaged apparatus such as a wireless telephone, personal digital assistant (PDA), gaming device or console, portable navigation device, or other device that uses internal non-volatile memory. In a particular embodiment, the data storage device includes a non-volatile memory, such as a flash memory (e.g., NAND, NOR, Multi-Level Cell (MLC), Divided bit-line NOR (DI-NOR), AND, high capacitive coupling ratio (HiCR), asymmetrical contactless transistor (ACT), or other flash managed devices).

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
in a data storage device with a non-volatile memory and a controller operative to manage the non-volatile memory and to generate management data for managing the non-volatile memory, performing when the storage device is coupled to a host device:
determining whether there is a need to back up the management data;
if it is determined that there is a need to back up the managements data, initiating the back up by originating at the controller a direct memory access (DMA) transfer of the management data to the host device wherein the DMA transfer includes sending, to a host processor or to a host DMA controller, an instruction to transfer the management data into a host memory;
determining if there is a need to retrieve the management data; and
if it is determined that there is a need to retrieve the management data and
the management data is retrievable from the host device, initiating a DMA retrieval of the management data, wherein initiating the DMA retrieval includes sending, to the host processor or to the host DMA controller, an instruction to retrieve the management data from the host memory, and receiving from the host device the management data retrieved from the host memory.

2. The method of claim 1, wherein the management data is transferred to the host device as encrypted management data, and wherein a key for decrypting the encrypted management data is not provided to the host device.

3. The method of claim 1, wherein the management data for the non-volatile memory includes a logical address to physical address mapping table.

4. The method of claim 1, wherein the data storage device includes a volatile memory and wherein the controller originates the DMA transfer to the host device as a virtual extension of the volatile memory.

5. The method of claim 1, wherein the controller originates the DMA transfer to the host device when the data storage device is to be powered down.

6. The method of claim 1, wherein the controller originates the DMA retrieval from the host device when the data storage device receives power.

7. The method of claim 1, wherein the DMA transfer of the management data from the data storage device to the host device is initiated using the instruction to transfer the management data and wherein the instruction includes transfer parameters indicate the management data to be transferred.

8. The method of claim 1, wherein the data storage device is an embedded memory device.

9. The method of claim 1, wherein the host memory comprises RAM.

10. The method of claim 1, wherein the controller further comprises a DMA controller.

11. A data storage device comprising:
a non-volatile memory; and
a controller coupled to the non-volatile memory, wherein the controller is operative to manage the non-volatile memory and to generate management data for managing the non-volatile memory, wherein the controller is operative, when the data storage device is coupled to a host device, to perform operations including:
determining whether there is a need to back up the management data;
if it is determined that there is a need to back up the managements data, initiating the back up by sending, to a host processor or to a host DMA controller, an instruction to transfer the management data into a host memory;
determining if there is a need to retrieve the management data;
if it is determined that there is a need to retrieve the management data and the management data is retrievable from the host memory, initiating a DMA retrieval of the management data from the host device by sending, to the host processor or to the host DMA controller, an instruction to retrieve the management data from the host memory; and
receiving from the host device the management data retrieved from the host memory.

12. The data storage device of claim 11, wherein the controller is configured to encrypt the management data and to transfer the encrypted management data to the host device without providing to the host device a key for decrypting the encrypted management data.

13. The data storage device of claim 11, wherein the management data for the non-volatile memory includes a logical address to physical address mapping table.

14. The data storage device of claim 11, wherein the data storage device includes a volatile memory and wherein the controller is configured to originate data management transfer to use the host memory as a virtual extension of the volatile memory.

15. The data storage device of claim 11, wherein the controller is configured to originate transfer of the management data to the host device when the data storage device is to be powered down.

16. The data storage device of claim 11, wherein the controller is configured to originate the DMA retrieval of the management data from the host device to the data storage device when the data storage device receives power after transferring the management data to the host device and being powered down.

17. The data storage device of claim 11, wherein the controller includes a DMA controller.

18. The data storage device of claim 11, wherein the controller is configured to initiate the transfer of the management data from the data storage device to the host device by sending the instruction to the host device, wherein the instruction includes transfer parameters.

19. The data storage device of claim 11, wherein the data storage device includes one of:
   a removable memory; and
   an embedded memory.

20. The data storage device of claim 11, wherein the host memory comprises RAM.

* * * * *